J. C. VAN BERKEL.
MEAT SLICING MACHINE.
APPLICATION FILED AUG. 2, 1910.
1,057,188.
Patented Mar. 25, 1913.
3 SHEETS—SHEET 2.
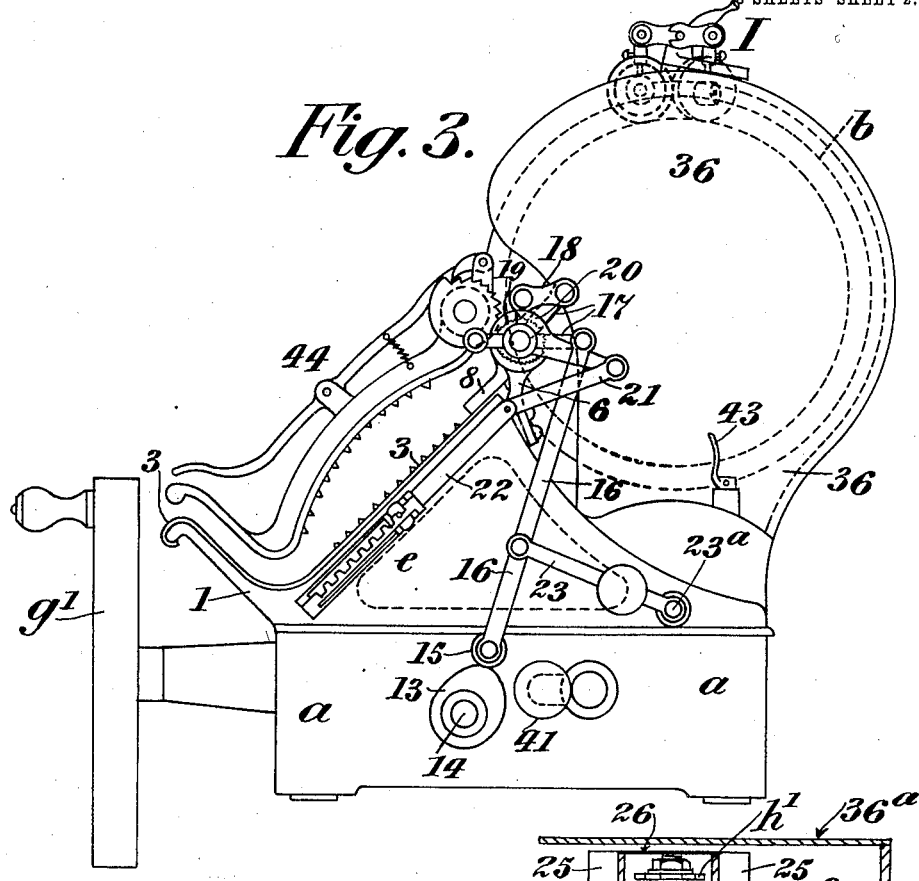
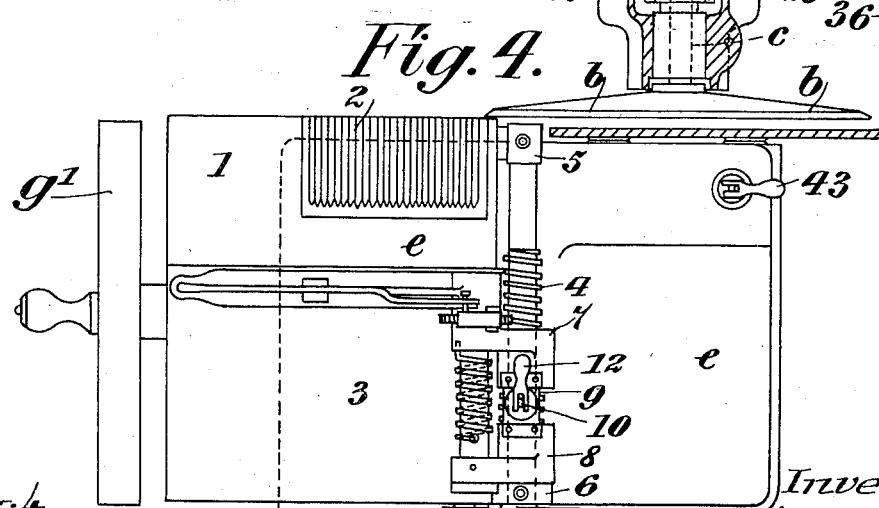

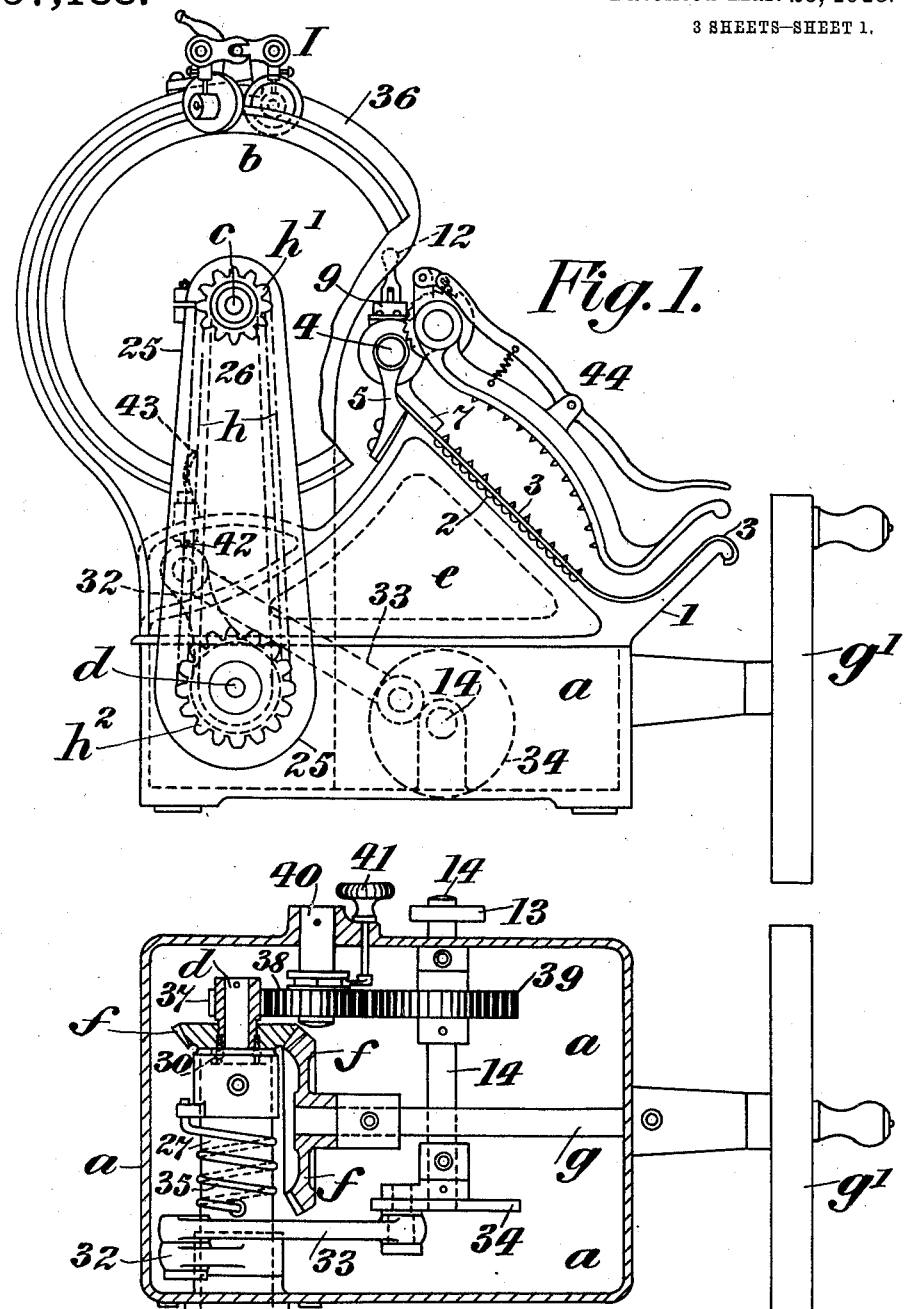

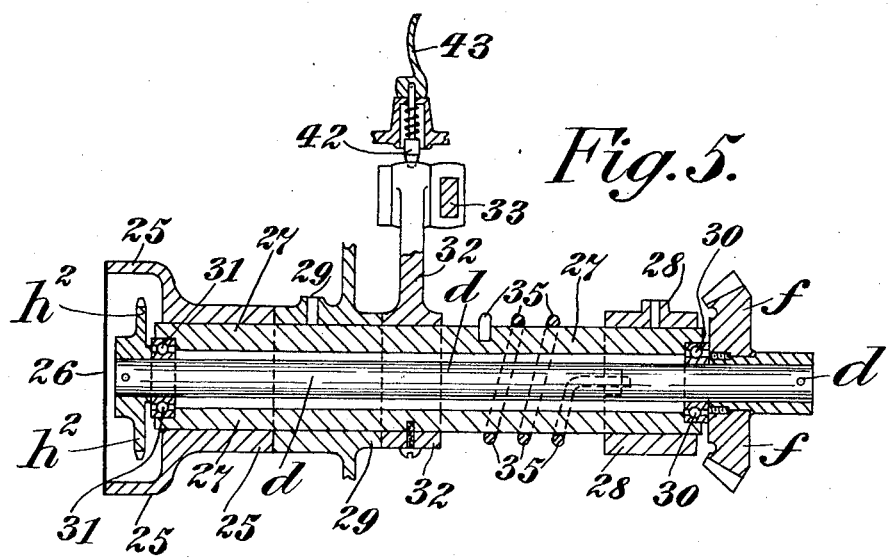
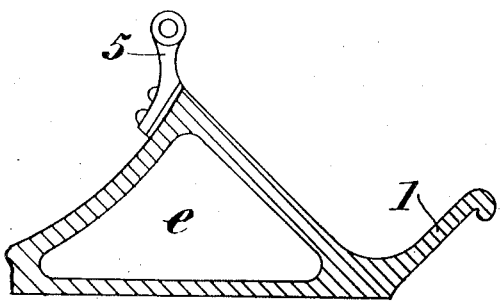

UNITED STATES PATENT OFFICE.

JOHANNES CORNELIS VAN BERKEL, OF ZURICH, SWITZERLAND.

MEAT-SLICING MACHINE.

1,057,188.

Specification of Letters Patent. Patented Mar. 25, 1913.

Application filed August 2, 1910. Serial No. 575,053.

*To all whom it may concern:*

Be it known that I, JOHANNES CORNELIS VAN BERKEL, a subject of the Queen of the Netherlands, residing at Zurich, Switzerland, have invented certain new and useful Improvements in Meat-Slicing Machines, of which the following is a specification.

This invention relates to meat slicing machines of the class in which a rotating knife is swung or moved through an arc so as to slice the meat which latter is automatically fed forward on a table for slicing.

Under this invention I make the machine with an inclined or angled table upon which the meat is fed forward automatically and is cut by a rotating circular knife which is moved through a curvilinear path so as to cut the meat from its upper end downward the slices as they are severed falling down and away from the meat.

The machine comprises other novel features of construction as hereinafter pointed out in the claims.

The rotary knife is so made or arranged or the table is so arranged relatively with the knife, that the latter only comes in contact with the meat at its peripheral edge thereby avoiding excessive friction while cutting.

In order that my invention may be clearly understood I have hereunto appended explanatory drawings whereon:—

Figure 1 represents an end elevation of my improved meat slicing machine showing a portion of the rotary knife broken away and removed. Fig. 2 represents a horizontal section of the machine, illustrating the mechanism for rotating and oscillating the knife. Fig. 3 represents a rear end elevation of the machine. Fig. 4 represents a top plan view of the machine, showing a part of the casing inclosing the knife and the bearing for the same in horizontal section. Fig. 5 represents a sectional detail view illustrating the mechanism by which the knife is rotated and oscillated. Fig. 6 represents a sectional detail view of the inclined table upon which the meat is supported.

$a$ is the base which is adapted to be mounted upon a counter or table or such like.

$b$ is the rotary circular knife which is preferably made of a dished or concave formation and is keyed to a spindle $c$ rotated by chain and sprocket gear $h$, $h^1$, $h^2$, from a shaft $d$ which latter is rotated by the bevel gear $f$ from a shaft $g$ driven by a hand wheel $g^1$ or a motor or otherwise.

The table $e$ which is fixed to or made one with the base is inclined upward at an angle, as shown clearly in Figs. 1 and 3, being preferably made of somewhat triangular form and bolted to the base. It has, at its lower end, a projecting part 1 which extends outward at or about right angles. The front part of this inclined table has a series of shallow grooves 2 which assist in holding and guiding the meat while being cut. Upon the inclined table and conforming therewith is a slide 3 having a part at or about right angles covering the similar part of the table and this slide (or meat plate as it is usually called) with the meat thereon, is fed forward, as usual, intermittently, by means of a screw 4 the ends of which pass through bearing brackets 5, 6, secured to the inclined table and projecting upward from the apex thereof. Secured to the slide are two brackets 7, 8, having enlarged parts surrounding and sliding on the screw 4 and which are connected together by a bridge 9 having a pin 10 therein with the usual half nut (not shown) for engaging the screw, this half nut being moved into and out of engagement with the screw by means of a cam lever 12.

The screw 4 is turned so as to give the intermittent forward motion to the slide by means of a cam 13 on the shaft 14 the cam, as it rotates, acting on a roller 15 at the lower end of a rod 16 which latter, at its upper end, is jointed to a bell crank lever 17 for operating the feed pawl 18 and ratchet 19 on the feed screw. The feed can be regulated by means of the cam 20, link 21, and slide 22 in the same manner as in W. A. Van Berkel's specification No. 920506 dated 4th May, 1909. The rod 16 is held in position by a radial arm 23 pivoted at 23ª which may be weighted so as to retain the roller 15 in contact with the feed cam 13.

The knife $b$ is carried at the upper end of a strong gear case or frame 25 having a nickel plated front 26 and which is secured to a sleeve 27 (see also Fig. 5) surrounding the shaft $d$ and working in bearings 28, 29. The shaft runs in ball bearings 30, 31, within the sleeve which latter and also the gear case is rocked by the arm 32 of the sleeve connected by a rod 33 to the disk 34 keyed on the shaft 14 and operated thereby. The shaft 14 is rotated by the spur gearing 37, 38, 39, from the shaft *d*. To counteract the weight of the knife and thereby reduce the effort required to drive the machine a torsion spring 35 is provided which, at one end, is connected to the sleeve and at its other end to the bearing 28. Means may be provided for tightening up the spring if so desired.

The knife sharpening device I may be such as described in the specification of W. A. Van Berkel's Patent No. 947,606, dated 25th January, 1910 and is mounted on the fixed standard or knife case 36. When it is desired to sharpen the knife the idle gear wheel 38 is pulled along its pin 40 out of engagement by means of the knob 41 so that the mechanism for swinging the knife is stopped and the swinging arm 32 can also be locked by the spring pin 42 operated by the cam lever 43. When this has been done the shaft *g* and knife can be rotated so as to be sharpened in the usual manner by the sharpener.

44 is the meat clamp.

The knife case 36 may have the outer side 36ᵃ of glass or mica.

The knife is circular as before stated and it is adapted to contact with the meat only at its periphery while cutting. The peripheral contact can be effected by making the knife dished or concave or by making it flat and arranging it at an angle to the table or the table at an angle to it.

The incline of the table is about at an angle of forty-five degrees and if produced forms a chord to the arc described by the center of the rotary knife, so that as the revolving knife descends upon the meat which is clamped in the meat clamp, said knife will begin cutting into the upper corner of the meat and compress the meat against the meat-plate, thus insuring a clear cut through to the lower corner and insuring against tearing or shredding of the meat at the end of the cut. As the slice is severed from the piece of meat, it will fall over, away from the piece and away from the knife, whereby all friction of the slice against the knife will be avoided, rendering cutting easier and avoiding tearing of the meat by its adhering to the knife.

Having now fully described my invention what I claim and desire to secure by Letters Patent is:—

1. In a machine of the character stated, an inclined table for supporting the article to be sliced, a circular knife adapted to contact with the meat only at its cutting edge, means for supporting and guiding said knife to travel in an arc of which said inclined table if produced would be the chord, means for oscillating said knife, and means for rotating the knife.

2. In a machine of the character stated, an inclined table for supporting the article to be sliced, a circular knife adapted to contact with the meat only at its cutting edge, means for supporting and guiding said knife to travel in an arc of which said inclined table if produced would be the chord, means for oscillating said knife, means for rotating the knife, and means for intermittently feeding the article to be sliced into the path of the cutter.

3. In a machine of the character stated, a frame pivoted at one end, a dished circular knife journaled in the outer end of said frame, an inclined table for the article to be sliced, so arranged that if produced it would form the chord to the arc in which the knife swings, means for oscillating the frame and knife and means for rotating the knife.

4. In a machine of the character stated, a table for supporting the article to be sliced and inclined at an angle of about forty-five degrees, a dished circular knife, means for supporting and guiding said knife to travel in an arc of which the inclined table if produced would be the chord, means for oscillating the knife, and means for rotating the knife.

5. In a meat slicing machine the combination of a table, a meat plate thereon, means for feeding forward the meat plate, means for holding meat on said plate, a rotatable circular knife, a gear case carrying said knife, a shaft for the knife, a pinion thereon, a chain for driving said pinion, a sprocket wheel, a shaft therefor, bevel gear for driving said shaft, a shaft with hand wheel for driving said bevel gear, a sleeve surrounding said sprocket wheel shaft, an arm on said sleeve, a connecting rod, a shaft for operating the connecting rod, means for driving the last mentioned shaft from the sprocket wheel shaft and means for locking the arm of the sleeve.

6. In a meat slicing machine the combination of a table, a meat plate thereon, means for feeding forward the meat plate, means for holding meat on said plate, a rotatable circular knife, a gear case carrying said knife, a shaft for the knife, a pinion thereon, a chain for driving said pinion, a sprocket wheel, a shaft therefor, bevel gear for driving said sprocket wheel shaft, a shaft with hand wheel for driving said bevel gear, a sleeve surrounding said first sprocket wheel shaft, an arm on said sleeve, a connecting rod, a shaft for operating the connecting rod, means for driving the last mentioned shaft, a spring pin for locking the arm of said sleeve and a lever for operating said pin.

7. In a meat slicing machine the combination of a table, a meat plate thereon, means for feeding forward the meat plate, means for holding meat on said plate, a rotatable circular knife, a gear case carrying said knife, a shaft for the knife, a pinion thereon, a chain for driving said pinion, a sprocket wheel, a shaft therefor, bevel gear for driving said sprocket wheel shaft, a shaft with hand wheel for driving said bevel gear, a sleeve surrounding said first sprocket wheel shaft, an arm on said sleeve, a connecting rod, a shaft for operating the connecting rod, means for driving the last mentioned shaft, a spring pin for locking the arm of said sleeve and a cam lever for operating said pin.

8. In a meat-slicing machine, a table for supporting the meat to be sliced, an oscillating frame, means for oscillating the latter, a rotary knife journaled in said frame, means for rotating said knife, and a spring connected in said oscillating frame and acting to counterbalance the weight of the knife.

9. In a meat-slicing machine, an inclined table for supporting the meat to be sliced, a frame journaled to oscillate in an arc to which said table if produced would form a chord, means for oscillating said frame, a rotary knife journaled in the outer end of said frame, means for rotating said knife, and a spring connected to said frame and acting against the same to counterbalance said frame and knife.

10. In a meat-slicing machine, an inclined table for supporting the meat to be sliced, a sleeve journaled beneath and to one side of said table, means for rocking said sleeve, a frame secured to one end of said sleeve, a circular rotary knife journaled in the outer end of said frame to oscillate in an arc to which the inclined table if produced would form the chord, a shaft journaled in the sleeve, means for revolving said shaft, gearing in the frame to communicate motion from the shaft to the knife, and a spring coiled around the sleeve and having one end secured to the same and the other end rigidly secured to counterbalance the weight of the knife and frame.

11. In a meat slicing machine the combination of a table with inclined surface, a meat plate thereon, a screw for feeding forward the meat plate, means for holding meat on said plate, a rotatable circular knife adapted to move through the arc of a circle, a gear case carrying said knife, means for rotating the knife, means for moving the knife through the arc of a circle, to which said inclined table would if produced form a chord, means for automatically operating the feed screw and means for regulating the feed.

12. In a meat slicing machine the combination of a table with inclined surface, a meat plate thereon, a screw for feeding forward the meat plate, means for holding meat on said plate, a rotatable circular knife adapted to move through the arc of a circle, a gear case pivotally carried at its lower end for carrying said knife, means for rotating the knife, means for moving the knife through the arc of a circle, to which said inclined table would if produced form a chord, means for automatically operating the feed screw and means for regulating the feed.

13. In a meat slicing machine the combination of a table with inclined surface, a meat plate thereon, a screw for feeding forward the meat plate, means for holding meat on said plate, a rotatable circular knife adapted to move through the arc of a circle, to which said inclined table would if produced form a chord, a gear case for carrying said knife, means for rotating the knife, means for moving the knife through the arc of a circle, and means for operating the feed screw, said means comprising a ratchet, a pawl, a bell crank, a rod jointed to said bell crank, a radial bar jointed to the rod and also pivoted to the table of the machine, and a cam for operating the said rod.

14. In a meat-slicing machine, a table for supporting the meat to be sliced, a rotary circular knife, means for supporting and guiding said knife to oscillate in an arc, a drive-shaft, gearing connected to said shaft and to the knife to rotate the same from said shaft, gearing connected to the knife supporting and guiding means to oscillate said knife and to said knife-rotating means, and removable gearing between such knife-rotating and knife oscillating means whereby such latter means may be disconnected while the knife is rotated.

In testimony whereof I affix my signature in presence of two witnesses.

JOHANNES CORNELIS van BERKEL.

Witnesses:
CHARLES FISCHER,
JOSEF SORMANI.